(12) United States Patent
Daly

(10) Patent No.: US 9,128,207 B2
(45) Date of Patent: Sep. 8, 2015

(54) COMPENSATING SEISMIC DATA FOR SOURCE VARIATIONS

(75) Inventor: Mark Daly, Horsham (GB)

(73) Assignee: WESTERNGECO L.L.C., Houston, TX (US)

( * ) Notice: Subject to any disclaimer, the term of this patent is extended or adjusted under 35 U.S.C. 154(b) by 1430 days.

(21) Appl. No.: 12/342,325

(22) Filed: Dec. 23, 2008

(65) Prior Publication Data

US 2010/0157733 A1 Jun. 24, 2010

(51) Int. Cl.
*G01V 1/00* (2006.01)
*G01V 1/37* (2006.01)

(52) U.S. Cl.
CPC .......................... *G01V 1/37* (2013.01)

(58) Field of Classification Search
CPC .......... G01V 1/36; G01V 1/364; G01V 1/375
USPC ...................................... 367/38–46
See application file for complete search history.

(56) References Cited

U.S. PATENT DOCUMENTS

| | | | |
|---|---|---|---|
| 3,895,343 A * | 7/1975 | Farr ............................... | 367/190 |
| 4,339,810 A | 7/1982 | Nichols et al. | |
| 4,630,242 A * | 12/1986 | Done ................................ | 367/73 |
| 4,648,080 A | 3/1987 | Hargreaves | |
| 5,134,590 A * | 7/1992 | Garotta ............................ | 367/38 |
| 5,400,299 A | 3/1995 | Trantham | |
| 6,161,076 A * | 12/2000 | Barr et al. ........................ | 702/17 |
| 6,522,974 B2 * | 2/2003 | Sitton .............................. | 702/17 |
| 6,891,776 B2 | 5/2005 | Moerig | |
| 6,977,867 B2 | 12/2005 | Chamberlain | |
| 7,376,046 B2 * | 5/2008 | Jeffryes .......................... | 367/41 |
| 7,627,433 B2 * | 12/2009 | Duren et al. .................... | 702/17 |
| 2006/0018192 A1 * | 1/2006 | Jeffryes et al. ................. | 367/41 |

OTHER PUBLICATIONS

PCT Search Report, dated May 31, 2010, Application No. PCT/US2009/063680.

* cited by examiner

*Primary Examiner* — Krystine Breier
(74) *Attorney, Agent, or Firm* — Kevin McGoff; David Matthews

(57) ABSTRACT

A technique includes modeling a fundamental component of a vibroseis sweep that is injected into the earth based on a ground force measurement and a reference sweep. The technique includes determining an operator to compensate seismic data acquired in response to the injected vibroseis sweep based at least in part on the reference sweep and the fundamental component, and the technique includes applying the operator to the seismic data.

19 Claims, 4 Drawing Sheets

COMPENSATING SEISMIC DATA FOR SOURCE VARIATIONS

BACKGROUND

The invention generally relates to compensating seismic data for source variations.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones) and others are sensitive to particle motion (e.g., geophones). Industrial surveys may deploy only one type of sensors or both. In response to the detected seismic events, the sensors generate electrical signals to produce seismic data. Analysis of the seismic data can then indicate the presence or absence of probable locations of hydrocarbon deposits.

One type of seismic source is an impulsive energy source, such as dynamite for land surveys or a marine air gun for marine surveys. The impulsive energy source produces a relatively large amount of energy that is injected into the earth in a relatively short period of time. Accordingly, the resulting data generally has a relatively high signal-to-noise ratio, which facilitates subsequent data processing operations. The use of an impulsive energy source for land surveys may pose certain safety and environmental concerns.

Another type of seismic source is a seismic vibrator, which is used in connection with a "vibroseis" survey. For a seismic survey that is conducted on dry land, the seismic vibrator imparts a seismic source signal into the earth, which has a relatively lower energy level than the signal that is generated by an impulsive energy source. However, the energy that is produced by the seismic vibrator's signal lasts for a relatively longer period of time.

SUMMARY

In an embodiment of the invention, a technique includes modeling a fundamental component of a vibroseis sweep that is injected into the earth based on a ground force measurement and a reference sweep. The technique includes determining an operator to compensate seismic data acquired in response to the injected vibroseis sweep based at least in part on the reference sweep and the fundamental component, and the technique includes applying the operator to the seismic data.

In another embodiment of the invention, a system includes an interface to receive first data that are indicative of a reference sweep for a seismic vibrator and second data that are indicative of a ground force measurement acquired during a time interval in which the vibrator injected a vibroseis sweep into the earth based on the reference vibroseis sweep. The system includes a processor to process the first and second data to determine an operator to compensate seismic data acquired by seismic receivers in response to the injected sweep by estimating a fundamental component of the injected vibroseis sweep based on the first and second data and determining the operator based at least in part on the estimated fundamental component and the first data.

In yet another embodiment of the invention, an article includes a storage medium to store computer readable instructions that when executed by a computer cause the computer to receive first data, which are indicative of a reference sweep for a seismic vibrator and second data, which are indicative of a ground force measurement acquired during a time interval in which the vibrator injected a vibroseis sweep into the earth based on the reference sweep. The instructions when executed by the computer cause the computer to process the first and second data to determine an operator to compensate seismic data acquired by seismic receivers in response to the injected vibroseis sweep by estimating a fundamental component of the injected vibroseis sweep based on the first and second data and determining the operator based at least in part on the estimated fundamental component and the first data.

Advantages and other features of the invention will become apparent from the following drawing, description and claims.

DETAILED DESCRIPTION

Figure 1:
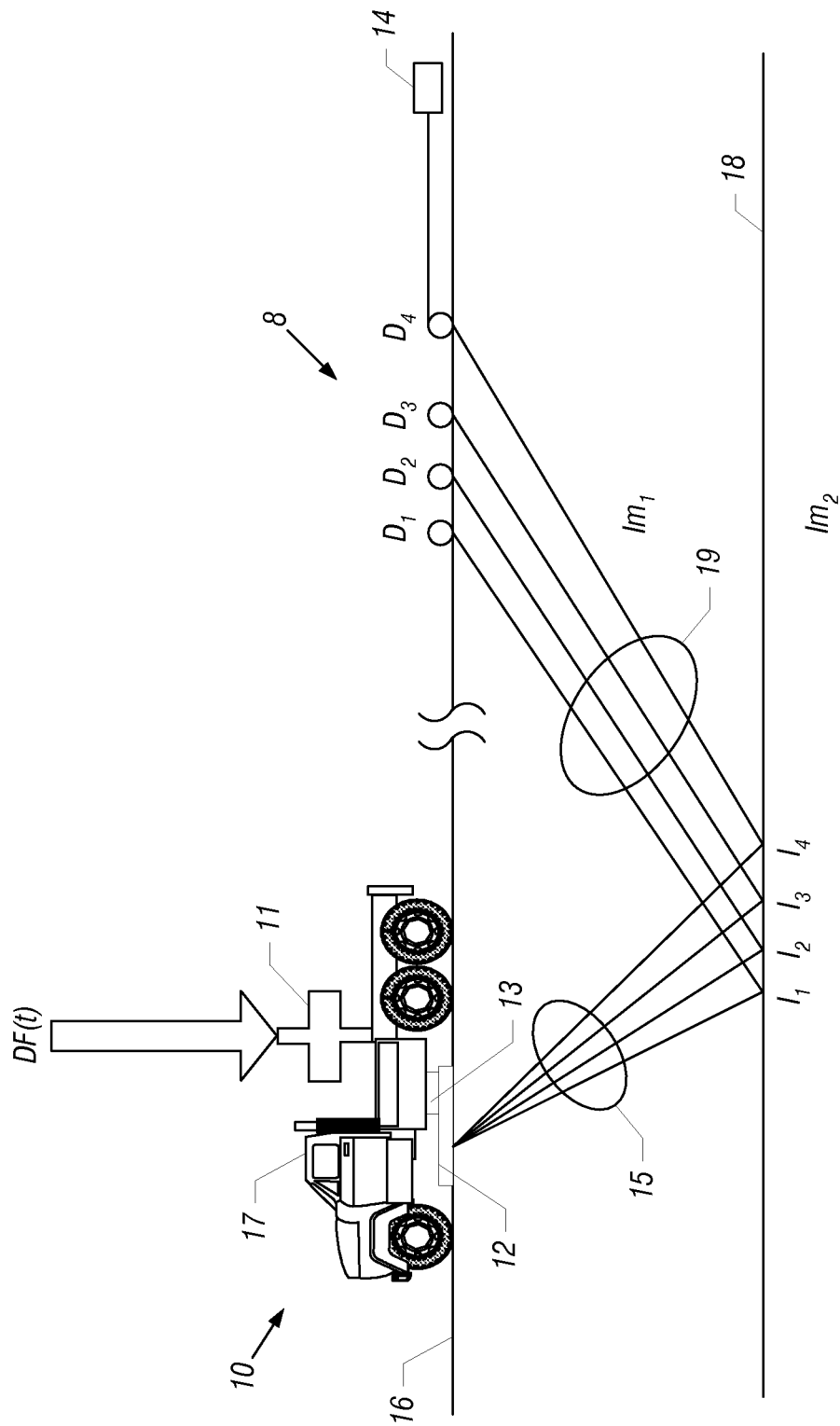
FIG. 1 is a schematic diagram of a vibroseis acquisition system according to an embodiment of the invention.

Referring to FIG. 1, an exemplary land-based vibroseis acquisition system 8 in accordance with embodiments of the invention includes at least one surface-located seismic vibrator 10; surface-located seismic sensors $D_1$, $D_2$, $D_3$ and $D_4$ (geophones, for example); and a data acquisition system 14. As part of operations associated with a vibroseis survey, the seismic vibrator 10 generates vibroseis seismic sweep sequences, or "vibroseis sweeps." More specifically, FIG. 1 depicts a subsurface sweep sequence signal 15 that is generated by the vibrator 10 during the survey for purposes of injecting a vibroseis sweep into the earth. An interface 18 between subsurface impedances $Im_1$ and $Im_2$ reflects the signal 15 at points $I_1$, $I_2$, $I_3$ and $I_4$ to produce a reflected signal 19 that is detected by the seismic sensors $D_1$, $D_2$, $D_3$ and $D_4$, respectively. The data acquisition system 14 gathers the raw seismic data acquired by the seismic sensors $D_1$, $D_2$, $D_3$ and $D_4$, and the raw seismic data may be processed to yield information about subsurface reflectors and the physical properties of subsurface formations.

For purposes of generating the signal 15, the seismic vibrator 10 may contain an actuator (a hydraulic or electromagnetic actuator, as examples) that drives a vibrating element 11 in response to a sweep pilot signal (called "DF(t)" in FIG. 1), which defines a reference sweep for the seismic vibrator 10. The DF(t) signal may be a sinusoid whose amplitude and frequency change during the generation of the sweep. Because the vibrating element 11 is coupled to a base pad, or plate 12, that is in contact with the earth surface 16, the energy from the element 11 is coupled to the earth to produce the signal 15.

Among its other features, the seismic vibrator 10 may include a signal measuring apparatus 13, which includes sensors (accelerometers, for example) to acquire a ground force measurement during the injected sweep. As depicted in FIG. 1, the seismic vibrator 10 may be mounted on a truck 17, an arrangement that enhances the vibrator's mobility.

The vibrating element 11 contains a reaction mass that oscillates at a frequency and amplitude that is controlled by the DF(t) pilot signal: the frequency of the DF(t) signal sets the frequency of oscillation of the reaction mass; and the amplitude of the oscillation, in general, is controlled by a magnitude of the DF(t) signal. During the generation of the sweep sequence, the frequency of the DF(t) signal transitions (and thus, the oscillation frequency of the reaction mass transitions) over a range of frequencies, one frequency at time. The amplitude of the DF(t) signal may be linearly or non-linearly varied during the generation sweep sequence pursuant to a designed amplitude-time envelope.

It is noted that unlike the seismic vibrator 10, a seismic vibrator may alternatively be constructed to be located in a borehole, in accordance with other embodiments of the invention. Thus, seismic sensors, such as geophones, may alternatively be disposed in a borehole to record measurements produced by energy that is injected by a borehole-disposed vibrator. Although specific examples of surface-located seismic vibrators and seismic sensors are set forth herein, it is understood that the seismic sensors and/or the seismic vibrator may be located downhole.

The injected sweep sequence generally follows the DF(t) pilot signal. However, the seismic vibrator 10 also emits unwanted harmonic energy into the sweep sequence, and as a result, harmonic and subharmonic energy appears in the measurement recorded by the seismic sensors $D_1, D_2, D_3$ and $D_4$. When more than one seismic vibrator is used for a given survey, the injected sweeps may vary in phase, amplitude and/or frequency from one vibrator to the next, even though the sweeps are driven by the same pilot signal DF(t). Furthermore, the vibroseis sweeps that are generated by a particular seismic vibrator may vary from shot to shot in amplitude, frequency and/or phase. In accordance with embodiments of the invention described herein, compensating operators are determined for purposes of compensating acquired seismic sweep data for shot-to-shot and vibrator-to-vibrator frequency, amplitude and/or phase variations to produce a consistent calibrated seismic dataset.

Figure 2:
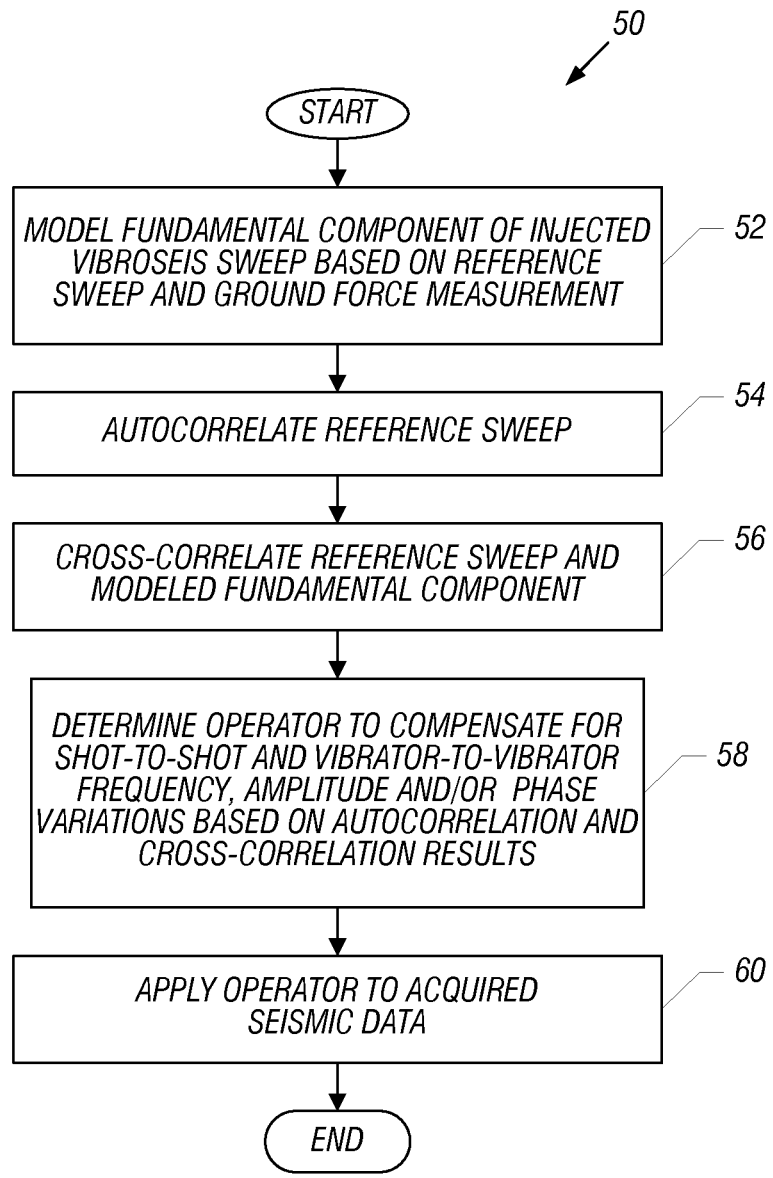
FIGS. 2 and 3 are flow diagrams depicting techniques to compensate seismic data acquired in response to a vibroseis sweeps according to embodiments of the invention.

Referring to FIG. 2, in accordance with embodiments of the invention described herein, a technique 50 may be used for purposes of compensating acquired seismic sweep data for the shot-to-shot and vibrator-to-vibrator variations. The technique 50 uses the reference sweep (indicated by the pilot signal DF(t) (see FIG. 1)) and the ground force measurement that is recorded at the seismic vibrator 10 to derive a compensating operator for each record. More specifically, pursuant to the technique 50, as further described herein, the reference vibroseis sweep and ground force measurement are used to model (block 52) the fundamental component of the injected vibroseis sweep. Next, an autocorrelation of the reference sweep is performed (block 54) as well as a cross-correlation of the reference sweep and the modeled fundamental component, pursuant to block 56. Based on the autocorrelation and cross-correlation results, an operator is determined (block 58) to compensate for the shot-to-shot and vibrator-to-vibrator frequency, amplitude and/or phase variations. This operator may then be applied to the seismic data that are acquired at the seismic sensors, pursuant to block 60, to produce a consistent, calibrated seismic dataset.

Turning now to a more specific example, in accordance with some embodiments of the invention, the fundamental component of the vibroseis sweep is modeled using the reference sweep and the ground force measurement. The measured ground force signal consists mainly of a fundamental and its harmonics and subharmonics. Although the seismic vibrator operates pursuant to the reference sweep and should ideally not contain the harmonics and subharmonics, various mechanics cause ground harmonics and subharmonics related to the sweep to be injected into the earth, and the injected fundamental may vary from the fundamental of the reference sweep. The closest component to the reference sweep is the fundamental and its relation to the reference sweep at each time may be approximated by a linear filter. The harmonics and subharmonics are generally considered to be unwanted signals that are emitted into the ground due to non-linearities, which are inherent in the vibrator system and the vibrator's base plate coupling to the ground.

In accordance with some embodiments of the invention, a least mean square (LMS) algorithm may be applied for purposes of modeling the fundamental component of the injected vibroseis sweep. More specifically, the LMS algorithm divides the measured ground force signal into a number of overlapping time windows. For each time window, the LMS algorithm attempts to minimize the error energy by determining filter coefficients that best match the reference sweep to the sweep that is indicated by the ground force measurement. As a more specific example, the LMS algorithm defines the following cost function:

$$e^2(t) = [d(t) - W^T(t)x(t)]^2, \qquad \text{Eq. 1}$$

where "W(t) represents the filter coefficients; "T" represents the transpose operation; "d(t)" represents a ground force measurement signal; and "x(t)" represents a reference sweep signal.

The error energy is minimized by deriving Eq. 1 with respect to the filter coefficients and setting the derivative to zero. The result is normal equations, in which the following relationship applies:

$$R(t)W(t) = P(t) \qquad \text{Eq. 2}$$

In Eq. 2, "R(t)" represents the reference correlation matrix, as set forth below:

$$R(t) = x(t)x^T(t). \qquad \text{Eq. 3}$$

Also in Eq. 2, "P(t)" represents the cross-correlation vector between the reference sweep signal and the measurement force data, as set forth below:

$$P(t) = x(t)d(t) \qquad \text{Eq. 4}$$

For purposes of emphasizing the portion of the ground force measurement signal, which correlates to the reference sweep signal, the correlation matrix may be decomposed by the application of singular value decomposition (SVD). More specifically, the reference correlation matrix may be written as follows:

$$R(t) = \sum_{k=1}^{L} \sigma_k u_k u_k^T. \qquad \text{Eq. 5}$$

Alternatively, the reference correlation matrix may be rewritten in terms of its eigenvalues and eigenvectors. The reference correlation matrix R(t) may be approximated by its principal components or the dominant terms after singular value decomposition, as set forth below:

$$R_1(t) = \sum_{k=1}^{P} \sigma_k u_k u_k^T, \qquad \text{Eq. 6}$$

where "P" is less than "L" (see Eq. 5). The P number is chosen in such a way that the emphasis is solely on extracting the part of the ground force measurement signal that correlates best with the reference sweep signal. In other words, "P" is chosen in a way that emphasizes the fundamental component.

To summarize, a reference sweep signal and a ground force measurement are obtained for a given injected vibroseis sweep. Both are analyzed using overlapping time windows, and a filter is calculated and applied that matches the ground force signal to the reference sweep signal in a least squares sense. The calculated filter is then applied to the measured ground force sweep signal to obtain the modeled fundamental component of the injected vibroseis sweep.

After the fundamental component of the vibroseis sweep is modeled, an ideal wavelet is calculated, in accordance with embodiments of the invention. The ideal seismic wavelet may be calculated by comparing a wavelet that is produced by cross-correlation of the reference sweep with the modeled fundamental component of the injected sweep. A wavelet shaping filter operator may then be derived, which when applied to the cross-correlation produces the ideal seismic wavelet. More specifically, according to the least squares principle, the wave shaping filter coefficients may be determined so that the sum I of the squared errors is a minimum, as described below:

$$I = \sum_{t=0}^{\omega} (d_t - c_t)^2, \quad \text{Eq. 7}$$

where "$d_t$" represents the desired reference wavelet and "$c_t$" represent the actual output wavelet. The sum of the squared errors is a minimum if its partial derivatives with respect to each of the filter coefficients are equal to zero, as set forth below:

$$\frac{\partial}{\partial a_j} I = 0. \quad \text{Eq. 8}$$

In Eq. 8, "$a_j$" represents the filter coefficients.

The above considerations lead to a set of simultaneous linear equations whose solution yields the required shaping filter. When put into matrix form, the equations contain the symmetric Toeplitz matrix, which may be solved, for example, by Levinson recursion. The result is the optimum Wiener filter operator.

Thus, pursuant to the technique that is disclosed herein, a compensating operator may be derived for each shot and contain all frequency, amplitude and/or phase corrections for shot and vibrator inconsistencies. The operator may then be convolved with the corresponding correlated seismic shot record to compensate the acquired seismic data for shot-to-shot and vibrator-to-vibrator phase, amplitude and/or frequency variations.

Figure 3:
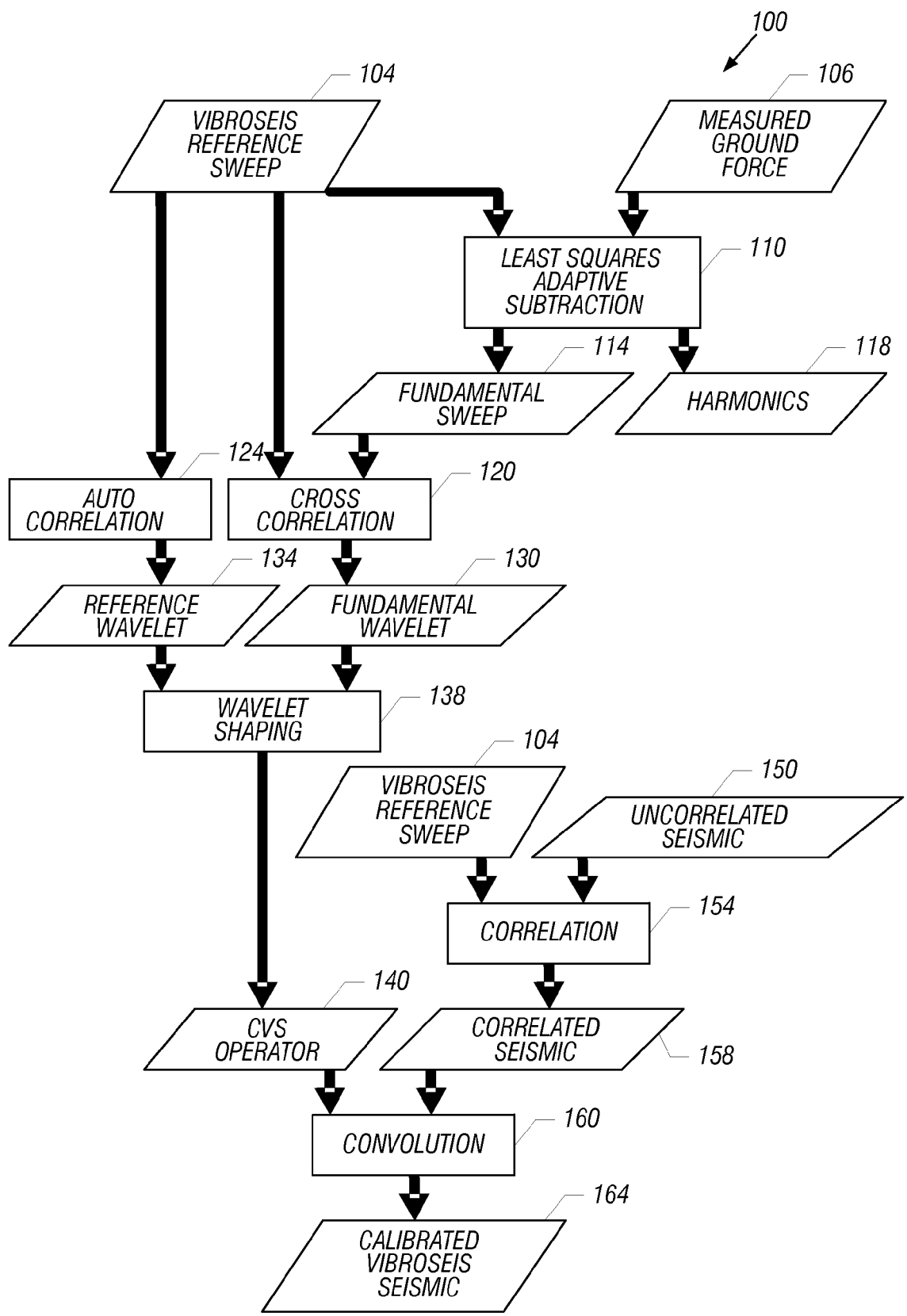

Referring to FIG. 3, to summarize, a technique 100 in accordance with embodiments of the invention may be used to compensate acquired seismic data for shot-to-shot and vibrator-to-vibrator variations. The technique 100 includes obtaining data 104, which are indicative of a vibroseis reference sweep and data 106, which are indicative of a measured ground force during the injected sweep. The data 104 and 106 are processed via a least squares adaptive subtraction technique (block 110) to represent the injected sweep as a modeled fundamental sweep 114 and harmonics 118.

A cross-correlation of the vibroseis reference sweep and the fundamental sweep 114 is then performed, pursuant to block 120, to produce a fundamental wavelet 130. An auto-correlation of the reference sweep is also performed, pursuant to block 124, to produce a reference wavelet 134. Wavelet shaping is then performed, pursuant to block 138, to derive a compensating operator 140 to match the fundamental 130 and reference 134 wavelets.

Using the compensating operator 140, uncorrelated seismic data 150 (acquired by seismic sensors in response to the injected vibroseis sweep) may be calibrated in the following fashion. First, the uncorrelated seismic data 150 is correlated with the vibroseis reference sweep, pursuant to block 154 to produce correlated seismic data 158. The correlated seismic data 158 may then be convolved, pursuant to block 160, with the compensating operator 140 to produce calibrated vibroseis seismic data 164.

Figure 4:
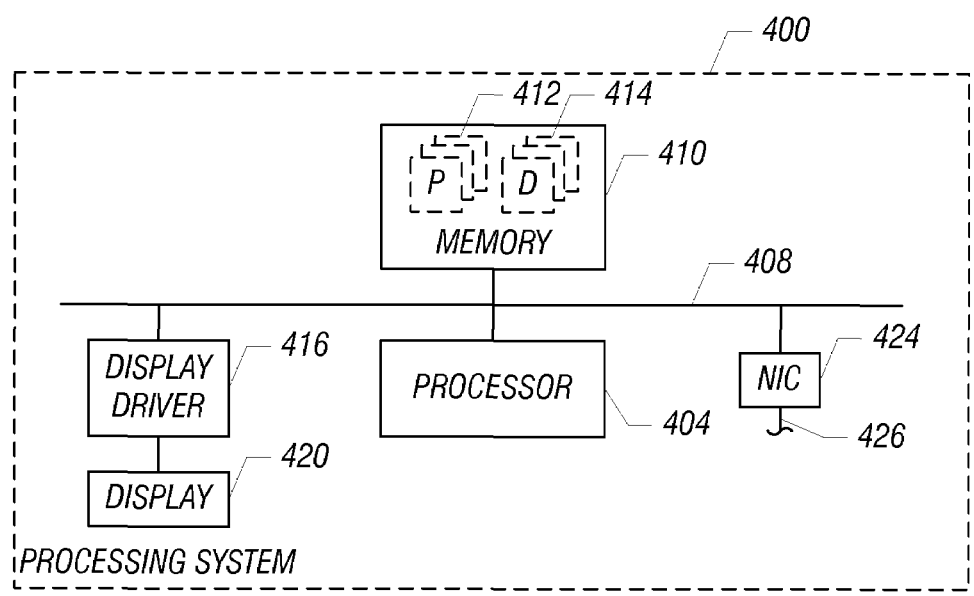
FIG. 4 is a schematic diagram of a processing system according to an embodiment of the invention.

Referring to FIG. 4, in accordance with some embodiments of the invention, the compensating operator may be determined by a processing system 400. In general, the processing system 400 may include at least one processor 404, such as a microcontroller or microprocessor; and in general, the processor 404 may be coupled through one or more buses 408 to a memory 410, which stores various programs 412 and datasets 414. The programs 412 may, when executed by the processor 404, cause the processor 404 to determine a compensating factor based on data that is indicative of the reference vibroseis sweep and the data, which are indicative of the ground force measurement. Thus, the programs 412, when executed, may cause the processor 404 to model a fundamental component of the injected vibroseis sweep and generally determine the compensating operator, pursuant to the technique 50 (see FIG. 2) or 100 (see FIG. 3).

Intermediate processing results may be stored as the datasets 414 in the memory 410. As examples, the datasets 414 may include data that are indicative of the model fundamental component. Additionally, the datasets 414 may include such information as the data that are indicative of the reference vibroseis sweep, as well as data that are indicative of the seismic data acquired in response to the vibroseis sweep and data that are indicative of the ground force measurement.

It is noted that FIG. 4 depicts merely an example of one out of many possible architectures for the processing system 400. Thus, many variations are contemplated and are within the scope of the appended claims. For example, in accordance with other embodiments of the invention, the processing system 400 may be a distributed processing system and thus, may include processing subsystems that are connected together and may be located in different locations.

For the processing system 400 that is depicted in FIG. 4, the processing system 400 may also include a display driver 416 that drives a display 420 for purposes of displaying the results of the processing by the processor 404. As examples, the display 420 may display time and frequency images related to the initial uncorrelated seismic data, reference vibroseis sweep, the ground force measurement, the acquired seismic data, the modeled fundamental component of the injected vibroseis sweep, the compensating operator, the compensated seismic data, etc. Thus, many variations are contemplated and are within the scope of the appended claims. Additionally, as depicted in FIG. 4, the processing system 400 may include interfaces to communicate with other computer and/or processing systems, such as a network interface card (NIC) 424, which is connected to a network 426.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
processing data indicative of a ground force measurement in a processor-based machine to model a fundamental component of a vibroseis sweep injected into the earth based at least in part on the ground force measurement and a reference sweep signal, the modeling comprising comparing the ground force measurement to the reference sweep signal to determine a filter to apply to the ground force measurement and applying the filter to the ground force measurement to determine the fundamental component;
determining an operator to compensate seismic data acquired in response to the injected vibroseis sweep based at least in part on the reference sweep and the fundamental component; and
applying the operator to the seismic data.

2. The method of claim 1, wherein the act of processing comprises:
using a least squares technique to determine the filter.

3. The method of claim 1, wherein the act of determining the operator comprises:
performing an autocorrelation of the reference sweep signal;
performing a cross-correlation of the reference sweep signal and the fundamental component; and
determining the operator based at least in part on the results of the autocorrelation and cross-correlation.

4. The method of claim 3, further comprising:
determining a reference wavelet based on the results of the autocorrelation;
determining a second wavelet based on the results of the cross-correlation; and
determining the operator based at least in part on the reference and second wavelets.

5. The method of claim 4, wherein the act of determining the operator based at least in part on the reference and second wavelets comprises determining a wave shaping filter operator.

6. The method of claim 1, wherein the act of applying the operator comprises:
performing cross-correlation of the seismic data to the reference sweep signal to generate correlated seismic data; and
performing convolution of the correlated seismic data and the operator.

7. A system comprising:
an interface to receive first data indicative of a reference sweep signal for a seismic vibrator and second data indicative of a ground force measurement acquired during a time interval in which the vibrator injected a vibroseis sweep into the earth based on the reference sweep signal; and
a processor to process the first and second data to determine an operator to compensate seismic data acquired by seismic receivers in response to the injected vibroseis sweep by comparing the ground force measurement to the reference sweep signal to determine a filter to apply to the ground force measurement, applying the filter to the ground force measurement to determine a fundamental component of the injected vibroseis sweep and determining the operator based at least in part on the reference sweep and the fundamental component.

8. The system of claim 7, wherein the operator compensates for phase, amplitude or frequency variations among shots originating from the vibrator.

9. The system of claim 7, wherein the operator compensates for phase, amplitude or frequency variations in injected sweeps generated by a plurality vibrators controlled by the reference sweep signal.

10. The system of claim 7, wherein the processor is further adapted to apply the operator to the seismic data to compensate the seismic data.

11. The system of claim 10, wherein the processor is adapted to process the first data and the seismic data to perform cross-correlation of the seismic data to the reference sweep signal to generate correlated seismic data and perform convolution of the correlated seismic data and the operator.

12. The system of claim 7, wherein the processor is adapted to process the first data to perform an autocorrelation of the reference sweep signal, performing a cross-correlation of the reference sweep and the fundamental component, and determine the operator based at least in part of the results of the autocorrelation and cross-correlation.

13. The system of claim 12, wherein the processor is adapted to process the first data to determine a reference wavelet based on the results of the autocorrelation, determine a second wavelet based on the results of the cross-correlation, and determine the operator based at least in part on the reference and second wavelets.

14. The system of claim 13, wherein the operator comprises a wave shaping filter operator.

15. An article comprising a storage medium to store computer readable instructions that when executed by a computer cause the computer to:
receive first data indicative of a reference sweep signal for a seismic vibrator and second data indicative of a ground force measurement acquired during a time interval in which the vibrator injected a vibroseis sweep into the earth based on the reference sweep signal; and
process the first and second data to determine an operator to compensate seismic data acquired by seismic receivers in response to the injected vibroseis sweep by comparing the ground force measurement to the reference sweep signal to determine a filter to apply to the ground force measurement, applying the filter to the ground force measurement determine a fundamental component of the injected vibroseis sweep and determining the operator based at least in part on the reference sweep and the fundamental.

16. The article of claim 15, the storage medium storing instructions that when executed by the computer cause the computer to apply the operator to the seismic data to compensate the seismic data.

17. The article of claim 15, the storage medium storing instructions that when executed by the computer cause the computer to process the first data and the seismic data to perform cross-correlation of the seismic data to the reference sweep signal to generate correlated seismic data and perform convolution of the correlated seismic data and the operator.

18. The article of claim 15, the storage medium storing instructions that when executed by the computer cause the computer to perform an autocorrelation of the reference sweep signal, perform a cross-correlation of the reference sweep signal and the fundamental component, and determine the operator based at least in part of the results of the autocorrelation and cross-correlation.

19. The method of claim 1, further comprising:
injecting the vibroseis sweep into the earth; and
measuring the ground force measurement to provide the data indicative of the ground force measurement.

* * * * *